US009648653B2

(12) United States Patent
Kim et al.

(10) Patent No.: US 9,648,653 B2
(45) Date of Patent: *May 9, 2017

(54) USER EQUIPMENT-INITIATED CONTROL METHOD AND APPARATUS FOR PROVIDING PROXIMITY SERVICE

(71) Applicant: LG ELECTRONICS INC., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

This patent is subject to a terminal disclaimer.

(21) Appl. No.: 14/365,076

(22) PCT Filed: Dec. 20, 2012

(86) PCT No.: PCT/KR2012/011160
§ 371 (c)(1),
(2) Date: Jun. 12, 2014

(87) PCT Pub. No.: WO2013/095001
PCT Pub. Date: Jun. 27, 2013

(65) Prior Publication Data
US 2015/0087233 A1    Mar. 26, 2015

Related U.S. Application Data

(60) Provisional application No. 61/577,667, filed on Dec. 20, 2011, provisional application No. 61/582,411, (Continued)

(51) Int. Cl.
*H04W 76/02*    (2009.01)
*H04W 4/00*    (2009.01)

(52) U.S. Cl.
CPC ......... *H04W 76/023* (2013.01); *H04W 4/008* (2013.01)

(58) Field of Classification Search
USPC ................. 455/41.2, 509; 370/328, 329
See application file for complete search history.

(56) References Cited

U.S. PATENT DOCUMENTS

| 2004/0132481 | A1* | 7/2004 | Sugaya | ................. H04W 88/02 |
| | | | | 455/550.1 |
| 2006/0168343 | A1* | 7/2006 | Ma | ........................ H04W 52/38 |
| | | | | 709/245 |

(Continued)

FOREIGN PATENT DOCUMENTS

| JP | 2007336167 | 12/2007 |
| KR | 20090086001 | 8/2009 |

(Continued)

OTHER PUBLICATIONS

Alcatel-Lucent et al., "Scope and Definitions for FS_ProSe", S1-113034, 3GPP TSG-SA WG1 Meeting #56, Nov. 2011, 2 pages.

(Continued)

*Primary Examiner* — Nay A Maung
*Assistant Examiner* — Erica Fleming-Hall
(74) *Attorney, Agent, or Firm* — Lee Hong Degerman Kang Waimey

(57) ABSTRACT

The present invention relates to a wireless communication system. More particularly, disclosed are a UE-initiated control method and apparatus for providing a proximity service. A method in which first user equipment of a wireless communication system performs a proximity service (ProSe) according to one embodiment of the present invention comprises: a step in which the first user equipment detects second user equipment with which the ProSe can be performed; a step of transmitting a message requesting for a permission of ProSe to a network node; a step of receiving (Continued)

a response to the request for a permission of ProSe from the network node; and a step of setting up a direct data path to the second user equipment.

11 Claims, 6 Drawing Sheets

Related U.S. Application Data filed on Jan. 2, 2012, provisional application No. 61/696,806, filed on Sep. 5, 2012.

(56) References Cited

U.S. PATENT DOCUMENTS

| | | | | |
|---|---|---|---|---|
| 2007/0237139 | A1* | 10/2007 | Garcia-Martin | H04L 29/06027 370/389 |
| 2010/0011110 | A1* | 1/2010 | Doppler | H04W 76/023 709/228 |
| 2010/0040029 | A1* | 2/2010 | Doppler | H04W 28/18 370/338 |
| 2011/0098043 | A1* | 4/2011 | Yu | H04W 60/00 455/435.1 |
| 2011/0205887 | A1* | 8/2011 | Wu | H04W 52/343 370/229 |
| 2011/0223953 | A1* | 9/2011 | Lee | H04W 76/023 455/509 |
| 2012/0077510 | A1* | 3/2012 | Chen | H04W 28/26 455/452.1 |
| 2012/0213183 | A1* | 8/2012 | Chen | H04W 72/1278 370/329 |
| 2012/0290872 | A1* | 11/2012 | He | H04W 4/005 714/4.11 |
| 2013/0005377 | A1* | 1/2013 | Wang | H04W 72/0406 455/509 |
| 2013/0013926 | A1* | 1/2013 | Hakola | H04W 12/04 713/171 |
| 2013/0051277 | A1* | 2/2013 | Hakola | H04W 76/023 370/254 |
| 2013/0290696 | A1* | 10/2013 | Broustis | H04L 9/08 713/150 |
| 2013/0303088 | A1* | 11/2013 | Watfa | H04W 4/008 455/41.2 |
| 2013/0329653 | A1* | 12/2013 | Russell, Jr. | H04W 4/005 370/329 |
| 2014/0066058 | A1* | 3/2014 | Yu | H04L 67/16 455/434 |
| 2014/0120907 | A1* | 5/2014 | Yu | H04W 76/023 455/426.1 |
| 2015/0043429 | A1* | 2/2015 | Kim | H04W 4/008 370/328 |

FOREIGN PATENT DOCUMENTS

| | | |
|---|---|---|
| KR | 20110103852 | 9/2011 |
| KR | 20110119555 | 11/2011 |

OTHER PUBLICATIONS

PCT International Application No. PCT/KR2012/011160, Written Opinion of the International Searching Authority dated Apr. 16, 2013, 16 pages.

* cited by examiner

FIG. 3
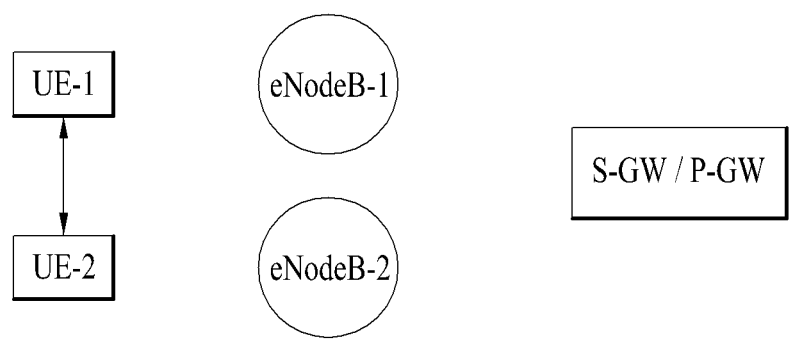
(a)
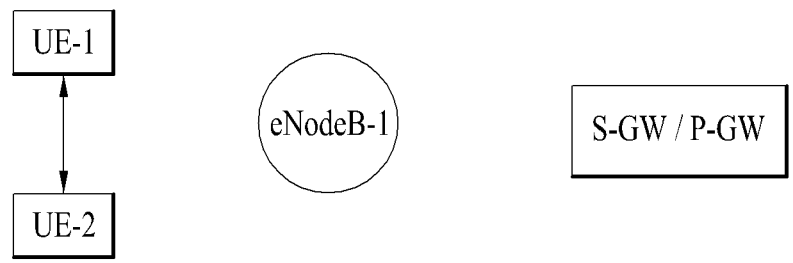
(b)

USER EQUIPMENT-INITIATED CONTROL METHOD AND APPARATUS FOR PROVIDING PROXIMITY SERVICE

CROSS-REFERENCE TO RELATED APPLICATIONS

This application is the National Stage filing under 35 U.S.C. 371 of International Application No. PCT/KR2012/011160, filed on Dec. 20, 2012, which claims the benefit of U.S. Provisional Application Ser. No. 61/577,667, filed on Dec. 20, 2011, 61/582,411, filed on Jan. 2, 2012 and 61/696,806, filed on Sep. 5, 2012, the contents of which are all hereby incorporated by reference herein in their entirety.

TECHNICAL FIELD

The present invention relates to a wireless communication system and, more particularly, to a user equipment (UE)-initiated control method and apparatus for providing proximity services.

BACKGROUND ART

A proximity service (ProSe) refers to a scheme for supporting communication between devices located physically close to each other. Specifically, ProSe is aimed to discover an application operating between devices which are in proximity and, ultimately, to support exchange of application-related data. For example, ProSe is applicable to applications such as social network services (SNS), commerce, and games.

ProSe may be also called device-to-device (D2D) communication. That is, ProSe refers to a communication scheme for establishing a direct link among a plurality of devices (e.g., user equipments (UEs)) and thus directly exchanging user data (e.g., voice, multimedia data, etc.) between the devices without going via a network. ProSe communication may include UE-to-UE communication, Peer-to-Peer communication, etc. Further, ProSe communication may be applied to Machine-to-Machine (M2M) communication, Machine Type Communication (MTC), etc. Accordingly, ProSe is considered as one solution for reducing the burden of a base station due to rapidly increasing data traffic. Besides, by adopting ProSe, effects such as reduction in procedures of a base station, reduction in power consumption of devices which participate in ProSe, increase in data transmission speed, increase in network capacity, load distribution, cell coverage expansion, etc. can be expected.

While adoption of ProSe is demanded as described above, a mechanism for supporting and controlling ProSe is not specifically prepared.

DISCLOSURE

Technical Problem

An object of the present invention devised to solve the problem lies in a method for allowing one UE to detect/discover another UE(s) to support ProSe between the UEs. Another object of the present invention devised to solve the problem lies in a method for setting up a direct data path between one UE and another UE(s) under the control of a network node when the UE desires to set up the direct data path with the other UE(s). A further object of the present invention devised to solve the problem lies in a method for allowing a UE performing ProSe to report ProSe related information to a network.

It is to be understood that both the foregoing general description and the following detailed description of the present invention are exemplary and explanatory and are intended to provide further explanation of the invention as claimed.

Technical Solution

The object of the present invention can be achieved by providing a method for performing a proximity service (ProSe) by a first user equipment (UE) of a wireless communication system, the method including detecting a second UE with which the first UE is capable of performing ProSe, transmitting a ProSe permission request message to a network node, receiving a response to the ProSe permission request from the network node, and setting up a direct data path to the second UE.

In another aspect of the present invention, provided herein is a user equipment (UE) for performing a proximity service (ProSe) in a wireless communication system, the UE including a transceiver module for transmitting and receiving signals to and from an external device, and a processor for controlling the transceiver module, wherein the processor is configured to detect another UE with which the UE is capable of performing ProSe, transmit a ProSe permission request message to a network node using the transceiver module, receive a response to the ProSe permission request from the network node using the transceiver module, and set up a direct data path to the other UE.

The followings may be commonly applied to the above method and the UE.

The second UE may be detected using one or more of a scheme for directly detecting the second UE by the first UE, a scheme for detecting the second UE based on information about the second UE provided from the network node, and a scheme for receiving information about the second UE detected by the network node.

The detected second UE may correspond to one or more of identification information of a UE to be detected, identification information of a user to be detected, identification information of a group to be detected, and identification information of a UE camped on the same base station or cell as the first UE.

The ProSe permission request message may include one or more of a request for use of ProSe, a request for direct communication, and a request for direct data path setup.

The ProSe permission request message may include one or more of information about one or more opposite UEs including the second UE, information about a media type, a content type, an application type, or a service type for ProSe, information about ProSe directionality, information about the amount of data for ProSe, and information about an access type for ProSe.

The ProSe permission request message may be transmitted immediately after the first UE detects the second UE, or at a point of time when direct communication with the second UE is required after the first UE detects the second UE.

The response to the ProSe permission request may indicate whether the ProSe permission request is accepted, which is determined by the network node using ProSe permission determination basis information.

The ProSe permission determination basis information may include one or more of subscriber information, ProSe related capability information, ProSe related capability enabled state information, preference related information, UE identification information, information about a media type, a content type, an application type, or a service type requested for ProSe, information about ProSe directionality, information about the amount of data requested for ProSe, and information about an access type requested for ProSe, of one or more of the first and second UEs.

The ProSe permission determination basis information may include one or more of operator policy information, network ProSe capability related information, and network congestion related information related to one or more of the first and second UEs.

The response to the ProSe permission request may include one or more of a response to a request for use of ProSe, a response to a request for direct communication, and a response to a request for direct data path setup.

The response to the ProSe permission request may include one or more of ProSe identification information, direct communication identification information, direct data path identification information, direct data path type information, Quality of Service (QoS) related information, policy control rule related information, charging control rule related information, and information indicating operation after ProSe is completely performed.

One or more of the ProSe identification information, the direct communication identification information, and the direct data path identification information may be defined with one or more granularities among a media or content type, an Access Point Name (APN), a QoS Class Identifier (QCI), a bearer or connection type, an application type, a service type, a destination domain, an opposite UE for communication, and a Closed Subscriber Group (CSG).

ProSe performance result information may be transmitted to the network node. The ProSe performance result information may include one or more of ProSe identification information, direct communication identification information, direct data path identification information, information indicating whether the direct data path is successfully set up, information about the amount of data communicated through the direct data path, information about a time for which the direct data path is maintained, information about the types of media or contents communicated through the direct data path, information about the number of opposite UEs including the second UE, information about directionality of the direct data path, information about an access type used for the direct data path, and information about the number and types of bearers used for the direct data path.

The network node may include one of a Mobility Management Entity (MME), a Serving GPRS (General Packet Radio Service) Supporting Node (SGSN), an evolved Node B (eNodeB) and a ProSe server.

It is to be understood that both the foregoing general description and the following detailed description of the present invention are exemplary and explanatory and are intended to provide further explanation of the invention as claimed.

Advantageous Effects

According to the present invention, a method for allowing one UE to detect/discover another UE(s) to support ProSe between the UEs may be provided. Further, a method for setting up a direct data path between one UE and another UE(s) under the control of a network node when the UE desires to set up the direct data path to the other UE(s) may be provided. In addition, a method for allowing a UE performing ProSe to report ProSe related information to a network may be provided.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 3 is a view illustrating a direct mode data path between two UEs based on ProSe;

BEST MODE

Figure 1:
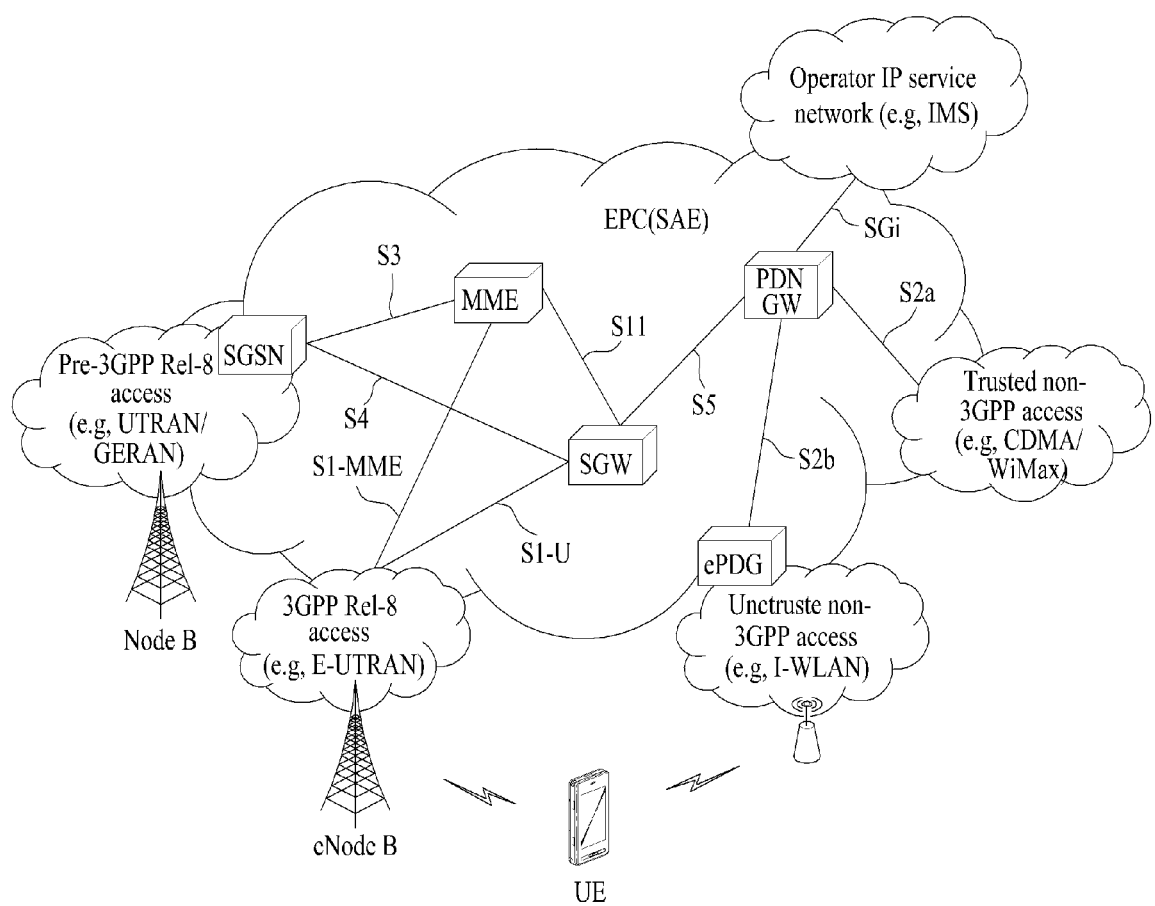
FIG. 1 is a view schematically illustrating the architecture of an Evolved Packet System (EPS) including an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, like reference numerals denote like elements in the drawings throughout the specification.

The embodiments of the present invention can be supported by standard documents disclosed for at least one of radio access systems such as Institute of Electrical and Electronics Engineers (IEEE) 802, 3rd Generation Partnership Project (3GPP), 3GPP Long Term Evolution (3GPP LTE), LTE-Advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various radio access systems. For clarity, the present disclosure focuses on 3GPP LTE and LTE-A systems. However, the technical features of the present invention are not limited thereto.

Terms used in the present specification are defined as follows.

UMTS (Universal Mobile Telecommunication System): A 3rd generation mobile communication technology based on Global System for Mobile communication (GSM), which is developed by 3GPP.

EPS (Evolved Packet System): A network system configured with an access network such as Evolved Packet Core (EPC), which is an Internet Protocol (IP)-based packet switched core network, LTE, UMTS Terrestrial Radio Access Network (UTRAN), etc. EPS is a network evolved from UMTS.

NodeB: A base station of a GSM/EDGE (Enhanced Data rates for GSM Evolution) Radio Access Network (GERAN)/UTRAN, which is installed outdoor and has a coverage corresponding to a macro cell.

eNodeB (evolved Node B): A base station of an LTE network, which is installed outdoor and has a coverage corresponding to a macro cell.

UE (User equipment): A user device. The UE may be referred to as a terminal, a mobile equipment (ME), a mobile station (MS), etc. In addition, the UE may be a portable device such as a laptop computer, a mobile phone, a personal digital assistant (PDA), a smartphone or a multimedia device, or a non-portable device such as a personal computer (PC) or a vehicle mounted device. The UE is capable of performing communication using a 3GPP spectrum such as LTE and/or a non-3GPP spectrum such as WiFi or public safety spectrum.

ProSe (Proximity service or Proximity-based service): Service enabling discovery and direct communication/communication via a base station/communication via a third device between physically adjacent devices. In this case, user plane data is exchanged through a direct data path without a 3GPP core network (e.g., EPC).

Proximity: Proximity of a UE to another UE is determined based on whether a predetermined proximity condition is satisfied. Different proximity conditions can be given for ProSe discovery and ProSe communication. The proximity condition may be configured to be controlled by an operator.

ProSe Discovery: A process that identifies that a UE is in proximity of another, using Evolved Universal Terrestrial Radio Access (E-UTRA).

ProSe Communication: A communication between UEs in proximity by means of a communication path established between the UEs. The communication path can be established directly between the UEs or routed via a local base station(s) (e.g., eNodeB(s)).

ProSe-enabled UE: A UE supporting ProSe discovery and/or ProSe communication.

ProSe-enabled Network: A network supporting ProSe discovery and/or ProSe communication.

RAN (Radio Access Network): A unit including a NodeB, an eNodeB and a radio network controller (RNC) for controlling the NodeB and the eNodeB in a 3GPP network. The RAN is present between a UE and a core network and provides connection to the core network.

HLR (Home Location Register)/HSS (Home Subscriber Server): A database having subscriber information in a 3GPP network. HSS may perform functions such as configuration storage, identity management and user state storage.

RANAP (RAN Application Part): An interface between RAN and a node (e.g., Mobility Management Entity (MME)/Serving GPRS (General Packet Radio Service) Supporting Node (SGSN)/Mobile Switching Center (MSC)) for controlling a core network.

PLMN (Public Land Mobile Network): A network configured to provide mobile communication service to individuals. PLMN can be configured on an operator basis.

NAS (non-access stratum): A functional layer for signaling and exchanging of traffic messages between a UE and a core network in a UMTS protocol stack. NAS supports mobility of the UE and supports a session management procedure for establishing and maintaining IP connection between a UE and a Packet Data Network GateWay (PDN GW).

Home NodeB (HNB): A base station of a UMTS network, which is mounted indoors and coverage of which forms a micro cell.

Home eNodeB (HeNB): A base station of an EPS network, which is mounted indoors and coverage of which forms a micro cell.

HNB (Home NodeB): Customer Premises Equipment (CPE) for providing UTRAN coverage. For details thereof, reference can be made to 3GPP TS 25.467.

HeNodeB (Home eNodeB): CPE for providing Evolved-UTRAN (E-UTRAN) coverage. For details thereof, reference can be made to 3GPP TS 36.300.

CSG (Closed Subscriber Group): A group of subscribers who are permitted to access one or more CSG cells of a Public Land Mobile Network (PLMN) as members of a CSG of a H(e)NB.

LIPA (Local IP Access): An access for an IP capable UE connected via a H(e)NB to another IP capable entity in the same residential/enterprise IP network. LIPA traffic is expected to not traverse a mobile operator's network. A 3GPP Release-10 system provides an access via a H(e)NB to resources of a local network (e.g., network located at the customer's home or enterprise).

SIPTO (Selected IP Traffic Offload): In a 3GPP Release-10 system, an operator selects a Packet data network GateWay (PGW) which is physically close to a UE in an EPC network and supports handover of user traffic.

PDN (Packet Data Network) Connection: A logical connection between a UE indicated by a single IP address (e.g., single IPv4 address and/or single IPv6 prefix) and a PDN indicated by an Access Point Name (APN).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a conventional gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control mechanism for providing proximity service (ProSe) The present invention proposes a control mechanism for supporting proximity service (ProSe) or D2D service in a mobile communication system such as 3GPP Evolved Packet System (EPS).

Due to increase in user demands related to social network service (SNS), etc., demands for detection/discovery between physically adjacent users/devices and special application/service (e.g., proximity-based application/service) has appeared. Even in a 3GPP mobile communication system, potential use cases and scenarios of ProSe and potential service requirements to provide such service are under discussion.

The potential use cases of ProSe may include commercial/social service, network offloading, public safety, integration of current infrastructure services (to assure the consistency of the user experience including reachability and mobility aspects). In addition, use cases and potential requirements for public safety in the case of absence of EUTRAN coverage (subject to regional regulations and operator policies, and limited to specific public-safety designated frequency bands and terminals) are under discussion.

In particular, the scope of discussion of ProSe by 3GPP assumes that proximity-based application/service is provided via LTE or WLAN, and that discovery and communication are performed between devices under the control of an operator/network.

Figure 2:
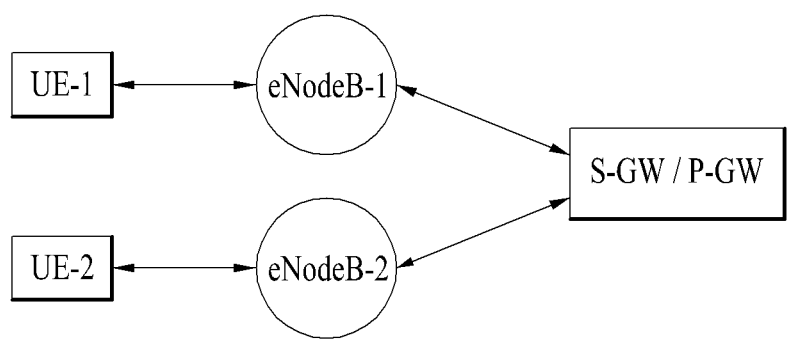
FIG. 2 is a view illustrating a default data path for communication between two UEs in an EPS.

FIG. 2 is a view illustrating a default data path for communication between two UEs in an EPS. That is, FIG. 2 illustrates an exemplary data path between UE-1 and UE-2 in a general case of no ProSe between UE-1 and UE-2. This default path goes via a base station (e.g., eNodeB or Home eNodeB) and gateway nodes (e.g., EPC or operator network). For example, as illustrated in FIG. 2, when UE-1 and UE-2 exchange data, data from UE-1 may be transmitted via eNodeB-1, S-GW/P-GW, and eNodeB-2 to UE-2 and, likewise, data from UE-2 may be transmitted via eNodeB-2, S-GW/P-GW, and eNodeB-1 to UE-1. Although UE-1 and UE-2 are camped on different eNodeBs in FIG. 2, UE-1 and UE-2 may be camped on the same eNodeB. In addition, although the two UEs are served by the same S-GW and P-GW in FIG. 2, various combinations of services are allowed here. For example, the UEs may be served by the same S-GW and different P-GWs, by different S-GWs and the same P-GW, or by different S-GWs and different P-GWs.

In the present invention, this default data path may be referred to as an infrastructure path, infrastructure data path, or infrastructure communication path. In addition, communication through the infrastructure data path may be referred to as infrastructure communication.

FIG. 3 is a view illustrating a direct mode data path between two UEs based on ProSe. This direct mode data path does not go via a base station (e.g., eNodeB or Home eNodeB) and gateway nodes (e.g., EPC).

FIG. 3(a) illustrates an exemplary case in which UE-1 and UE-2 are camped on different eNodeBs (e.g., eNodeB-1 and eNodeB-2) and exchange data via a direct mode data path. FIG. 3(b) illustrates an exemplary case in which UE-1 and UE-2 are camped on the same eNodeB (e.g., eNodeB-1) and exchange data via a direct mode data path.

It should be noted that a data path of a user plane is directly established between UEs without going via a base station or a gateway node as illustrated in FIG. 3, but a control plane path can be established via a base station and a core network. Control information exchanged through the control plane path may be information about session management, authentication, authorization, security, charging, etc. In the case of ProSe communication between UEs served by different eNodeBs as illustrated in FIG. 3(a), control information for UE-1 may be exchanged via eNodeB-1 with a control node (e.g., MME) of a core network, and control information for UE-2 may be exchanged via eNodeB-2 with a control node (e.g., MME) of a core network. In the case of ProSe communication between UEs served by the same eNodeB as illustrated in FIG. 3(b), control information for UE-1 and UE-2 may be exchanged via eNodeB-1 with a control node (e.g., MME) of a core network.

Figure 4:
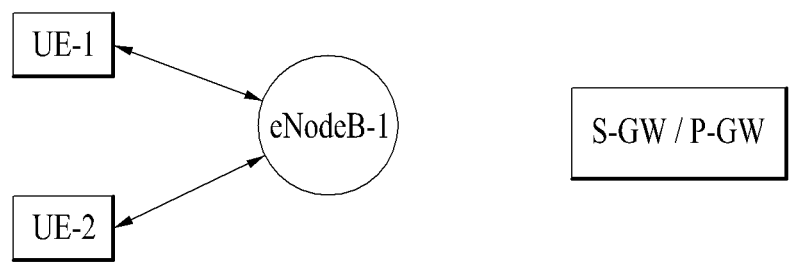
FIG. 4 is a view illustrating a locally-routed data path between two UEs based on ProSe.

FIG. 4 is a view illustrating a locally-routed data path between two UEs based on ProSe. As illustrated in FIG. 4, a ProSe communication data path between UE-1 and UE-2 is established via eNodeB-1 but does not go via a gateway node (e.g., EPC) operated by an operator. For a control plane path, if a locally-routed data path is established between UEs served by the same eNodeB as illustrated in FIG. 4, control information for UE-1 and UE-2 may be exchanged via eNodeB-1 with a control node (e.g., MME) of a core network.

In the present invention, the communication path described above in relation to FIGS. 3 and 4 may be referred to as a direct data path, data path for ProSe, ProSe-based data path, or ProSe communication path. In addition, communication through this direct data path may be referred to as direct communication, ProSe communication, or ProSe-based communication.

As described above, only potential use cases and requirements of ProSe, basic data paths, and control paths are under discussion, and details for the architecture and operation of a 3GPP network for supporting ProSe are not prepared. The present invention proposes specific examples of control plane signaling for enabling control of ProSe by an operator/network.

UE-Initiated Control Mechanism for Supporting ProSe

The present invention proposes UE-initiated control mechanisms for supporting ProSe.

A UE-initiated ProSe related control mechanism proposed by the present invention may include one of or a combination of two or more of 1) an operation for detecting/discovering an opposite UE by a UE (or user or subscriber), 2) an operation for transmitting a request for control/permission to use ProSe to a network by the UE, 3) an operation for determining whether to accept the ProSe control/permission request of the UE by the network, 4) an operation for transmitting a response to the ProSe control/permission request to the UE by the network, 5) an operation for performing direct communication with the opposite UE by the UE based on the response received from the network, and 6) an operation for reporting ProSe performance result information to the network by the UE. A description is now given of the operations 1) to 6) proposed by the present invention.

Embodiment 1

Embodiment 1 relates to an operation for detecting/discovering an opposite UE by a UE.

A UE (e.g., UE-1) which desires to use ProSe may detect/discover an opposite UE (e.g., UE-2). This may be called UE-initiated ProSe detection/discovery. UE-initiated ProSe detection/discovery may be performed by the UE autonomously or with the aid of a network.

For example, UE-1 may autonomously detect/discover an opposite UE using a physical distance, pre-configured information, a signal intensity, etc. with UE-2. Further, UE-1 may receive information required to detect/discover an opposite UE (e.g., location information, identification information, etc. of UE-2) through an information exchange mechanism (e.g., measurement report, etc.) with an eNodeB, and use the received information. In addition, a network node may discover or help to detect/discover an opposite UE for ProSe with UE-1.

The operation for detecting/discovering an opposite UE by UE-1 may be performed upon a request of a user or application, through communication with the opposite UE, or automatically based on information configured in UE-1.

The opposite UE (or target UE) detected/discovered by UE-1 may be restricted to a UE(s) which satisfies the following conditions. This restriction may be provided by UE-1 or a user or application of UE-1, or may be configured previously.

Identification information of a specific device(s) to be detected/discovered (e.g., UE identifier (ID)).

Identification information of a device(s) belonging to a specific user(s) to be detected/discovered (e.g., user ID).

Identification information of a device(s) belonging to a specific group(s) to be detected/discovered (e.g., group ID). Here, the group may be a user group or a commercial group (e.g., group of restaurants, theaters, etc.).

Identification information of a cell on which UE-1 is camped and a device(s) which is camped on the cell.

All device(s) detectable/discoverable by UE-1 or the network.

The above conditions are exemplary and the scope of the present invention is not limited thereto. Conditions related to a user among the above examples may also be regarded as conditions related to a subscriber.

The operation for detecting/discovering an opposite UE by UE-1 may include an operation for requesting the network to detect/discover an opposite UE and/or an operation for receiving information used to detect/discover an opposite UE from the network. In this case, UE-1 may exchange the information with one or more network nodes. A network node (or network control node) mentioned in the present invention may correspond to one or more of, for example, a network node for managing mobility, e.g., MME or SGSN, a network node for maintaining subscriber information, e.g., HSS, a network node for managing ProSe related information, e.g., ProSe server, an Authentication Authorization Accounting (AAA) server or AAA proxy involved in authentication, etc., an Access Network Discovery and Selection Function (ANDSF) entity, a gateway node, e.g., P-GW, and an eNodeB. Although MME is given as an example of a network node for exchanging signals with a UE in relation to ProSe in the following description, this is merely for clarity of explanation and the scope of the present invention is not limited thereto.

Embodiment 2

Embodiment 2 relates to an operation for transmitting a request for control/permission to use ProSe to a network by the UE.

One of a plurality of UEs (e.g., UE-1 and UE-2) which desire to perform ProSe therebetween may transmit the ProSe control/permission request message to the network. The ProSe control/permission request may be configured as information explicitly or implicitly including one or more of A to C described below.

A. A request of UE-1 (or UE-2) for control/permission of the network to use ProSe with UE-2 (or UE-1).

B. A request of UE-1 (or UE-2) for control/permission of the network to perform direct communication with UE-2 (or UE-1).

C. A request of UE-1 (or UE-2) to the network to set up a direct data path to UE-2 (or UE-1).

One of A, B and C may be transmitted, two or more may be transmitted separately, or a combination of two or more may be transmitted. For example, A, B and C may be signaled as a single message. Alternatively, A may be transmitted as a single message and B and C may be transmitted as another single message. Otherwise, A, B and C may be signaled as respective messages. Further, when A, B and C are signaled using a plurality of messages, the messages may be transmitted in parallel, or transmitted sequentially in such a manner that one message is completely exchanged (e.g., a request of the UE to the network and a response of the network to the UE are completely transmitted) and then another message is exchanged. Here, the order of the sequentially transmitted messages may be configured based on the number of cases. Alternatively, each of A, B and C may be transmitted as an independent message upon a specific event of the UE (e.g., a request of an application, etc.).

A UE(s) for transmitting the ProSe control/permission request may be configured independently. That is, the ProSe control/permission requests A, B and C may be transmitted by the same or different UEs. For example, a UE(s) for transmitting the ProSe control/permission request B for direct communication is not always the same as a UE(s) for transmitting the ProSe control/permission request A to use ProSe.

The ProSe control/permission request may include a piece of or a combination of two or more pieces of information described below.

Information about an opposite UE for ProSe or direct communication. If a plurality of opposite UEs are present, information indicating a plurality of UEs may be included. For example, when UE-1 detects/discovers and desires to perform ProSe with UE-2, UE-3 and UE-4, the ProSe control/permission request transmitted by UE-1 to the network may include information about UE-2, UE-3 and UE-4.

Information about media or contents to be communicated or communicable through ProSe or a direct data path. For example, information about a media or content type for which ProSe control/permission is requested (e.g., ProSe control/permission may be requested for a part or all of voice, video, image and text).

Information about applications for communication desired or enabled through ProSe or a direct data path. For example, information about an application type for which ProSe control/permission is requested.

Information about services for communication desired or enabled through ProSe or a direct data path. For example, information about a service type for which ProSe control/permission is requested (e.g., ProSe control/permission may be requested for a part or all of an instant messaging service, a file sharing service, a public safety service, a chatting service and a social networking service).

Information about directionality of communication desired or enabled through ProSe or a direct data path. For example, ProSe control/permission may be requested for a part or all of unidirectional communication from UE-1 to UE-2, unidirectional communication from UE-2 to UE-1, bidirectional communication between UE-1 and UE-2, and broadcasting from UE-1 to other UEs).

Information about the amount of data (e.g., the volume of traffic) for communication desired or enabled through ProSe or a direct data path.

Information about an access type (e.g., E-UTRAN, WLAN, etc.) to be used or usable for ProSe or direct communication.

One or more pieces of the above-described information may be configured individually or in combination and included in the ProSe control/permission request. Further, the information included in the ProSe control/permission request is not limited to the above examples, and the UE may include various types of ProSe related information in the ProSe control/permission request to be transmitted to the network.

A description is now given of a point of time when UE-1 transmits the ProSe control/permission request to the network.

UE-1 may transmit the ProSe control/permission request immediately after the opposite UE is detected/discovered. In this case, a conventionally defined signaling message or a signaling message newly defined for the present invention may be used to transmit the ProSe control/permission request.

Alternatively, UE-1 may transmit the ProSe control/permission request when direct communication with the opposite UE is actually desired after the opposite UE is detected/discovered. In this case, the ProSe control/permission request may be included in a signaling message for requesting direct data path setup and/or direct communication setup to the opposite UE, or a signaling message newly defined for the present invention may be used.

Further, if UE-1 requests the network to detect/discover an opposite UE(s) in Embodiment 1, the ProSe control/ permission request of Embodiment 2 may be explicitly or implicitly included in the ProSe detection/discovery request of Embodiment 1.

Embodiment 3

Embodiment 3 relates to an operation for determining whether to accept the ProSe control/permission request of the UE by the network.

A network node (e.g., MME) may determine/evaluate/verify whether to accept the ProSe control/permission request of the UE based on one or more pieces of information described below.

Subscriber information of UEs (e.g., UE-1 and UE-2) for which ProSe is requested.

Information about UE capability required to perform ProSe.

Information about enabled/disabled state of UE capability required to perform ProSe.

Information indicating whether the network is capable of providing ProSe.

Whether the network is capable of providing ProSe may mean a capability/function required by the network to detect/discover ProSe-enabled UEs (or to help a ProSe-enabled UE to detect/discover another ProSe-enabled UE). Alternatively, whether the network is capable of providing ProSe may mean a capability/function required by the network to allow UEs to perform direct communication (or to help direct communication between UEs). This capability/function may mean physical capability, functional capability, or both. That is, the capability/function may mean whether actual hardware (H/W) or software (S/W) for implementing the capability/function is present, a fact that ProSe is usable, or the intention to support ProSe.

Information about policies of a home operator and/or a visitor operator.

Information about roaming agreements.

Preference information of the UE (or a corresponding user/subscriber) and/or information about pre-configured conditions for reflecting the preference.

Pre-configured information of the network.

Information about a media or content type for which the UE requests ProSe control/permission.

Information about an application type for which the UE requests ProSe control/permission.

Information about a service type for which the UE requests ProSe control/permission.

Information about directionality of communication for which the UE requests ProSe control/permission.

Information about the volume of traffic for which the UE requests ProSe control/permission.

Information about an access type for which the UE requests ProSe control/permission.

Information indicating whether a RAN is congested.

Information indicating whether a core network is congested.

State information of the UE (e.g., location information of the UE, for example, an eNodeB, Cell ID, etc. on which the UE is camped, the signal intensity of the UE, etc.)

The network node (e.g., MME) may determine whether to accept the ProSe control/permission request of the UE in consideration of one or more pieces of the above information. However, the above information is exemplary and the network node may determine whether to accept the ProSe control/permission request of the UE based on other types of information. In the present invention, the above-described types of information are collectively referred to as "ProSe control/permission determination basis information".

Here, a UE mentioned by the ProSe control/permission determination basis information may be UE-1 which has transmitted the ProSe control/permission request, an opposite UE (e.g., UE-2) with which UE-1 requests to use ProSe (or to set up a direct data path/to perform direct communication), or both.

Further, the ProSe control/permission determination basis information may be acquired or determined by a network control node (e.g., MME) based on one or more of the following schemes.

Information pre-configured in the MME.

Information previously acquired and stored by the MME from one or more of the UE (e.g., UE-1 and/or UE-2), HSS, eNodeB and a third node (e.g., ProSe server).

The ProSe control/permission determination basis information is included in the ProSe control/permission request of Embodiment 2, which is received from the UE.

The ProSe control/permission determination basis information is acquired by the MME through additional interaction with the UE (e.g., UE-1 and/or UE-2), HSS, eNodeB or a third node (e.g., ProSe server).

In the above examples, the HSS and the third node may include a node related to UE-1 and/or a node related to UE-2.

Further, the above-described operation for determining whether to accept the ProSe control/permission request by the network node (e.g., MME) may include an operation for determining the type of a direct data path (e.g., the direct mode of FIG. 3 and/or the locally-routed mode of FIG. 4) to be permitted between the UE (e.g., UE-1) which has requested ProSe control/permission and the opposite UE (e.g., UE-2), and an operation for determining the type of a direct data path to be created.

Embodiment 4

Embodiment 4 relates to an operation for transmitting a response to the ProSe control/permission request to the UE by the network.

The response to the ProSe control/permission request transmitted to UE-1 (or UE-2) by the MME may be configured as information explicitly or implicitly including one or more of A to C described below.

A. A response to the request of UE-1 (or UE-2) for control/permission of the network to use ProSe with UE-2 (or UE-1).

B. A response to the request of UE-1 (or UE-2) for control/permission of the network to perform direct communication with UE-2 (or UE-1).

C. A response to the request of UE-1 (or UE-2) to the network to set up a direct data path to UE-2 (or UE-1).

One of A, B and C may be transmitted, two or more may be transmitted separately, or a combination of two or more may be transmitted. For example, A, B and C may be signaled as a single message. Alternatively, A may be transmitted as a single message and B and C may be transmitted as another single message. Otherwise, A, B and C may be signaled as respective messages. Further, when A, B and C are signaled using a plurality of messages, the messages may be transmitted in parallel, or transmitted sequentially in such a manner that one message is completely exchanged (e.g., a request of the UE to the network and a response of the network to the UE are completely transmitted) and then another message is exchanged. Here, the order of the sequentially transmitted messages may be configured based on the number of cases. Alternatively, each of A, B and C may be transmitted as an independent message upon a specific event of the network (e.g., a request of an application, etc.).

The response to the ProSe control/permission request may include one or more pieces of information described below.

Identification information of ProSe for which the ProSe control/permission request is accepted (e.g., reference number of ProSe).

Identification information of direct communication for which the ProSe control/permission request is accepted (e.g., reference number of direct communication).

Information about a direct data path set up or permitted to be set up between UEs (e.g., UE-1 and UE-2). For example, the information about a direct data path may include identification information of a direct data path (e.g., reference number of a direct data path), and an access type used by the direct data path (e.g., E-UTRAN, WLAN, etc.).

Information about the type of the direct data path set up or permitted to be set up between UEs (e.g., UE-1 and UE-2). For example, information indicating a direct mode data path, a locally-routed data path, or both.

Various types of information required to set up the direct data path between UEs (e.g., UE-1 and UE-2). For example, information required to set up a bearer for media to be communicated through the direct data path may include one or more of Quality of Service (QoS) related information, policy control rule related information, and charging control rule related information. If the information about media to be communicated through the direct data path is not present, information about all media may be included.

Information indicating operations to be performed after ProSe is performed with the opposite UE.

Among the above examples, the QoS related information may include QoS Class Indicator (QCI), Resource Type (e.g., Guaranteed Bit Rate (GBR) or non-GBR), Priority, Packet Delay Budget, Packet Error Loss Rate, Maximum Bit Rate (MBR), Allocation Retention Priority (ARP), Aggregated MBR (AMBR), etc.

The policy control rule related information may include, if dynamic Policy and Charging Control (PCC) is applied, a part or all of policy control rules received from a Policy & Charging Rules Function (PCRF) entity, or policy control rules processed to be interpretable/applicable by the UE. An individual UE may perform QoS control and gating control for ProSe or the direct data path based on the received policy control rules.

The charging control rule related information may include a part or all of charging control rules received from a network node which is in charge of online/offline charging, or charging control rules processed to be interpretable/applicable by the UE, and information indicating the condition, time, etc. for collecting information for charging by an individual UE based on a corresponding charging control rule. Based on this information, charging differentiated from that for another type of communication (e.g., infrastructure communication) may be performed for ProSe or a direct communication, and an individual UE may acquire and transmit information for charging to the network.

In addition, among the various types of information included in the response to the ProSe control/permission request, the reference number of ProSe/direct communication/direct data path may be configured with various granularities. For example, the reference number of ProSe/direct communication/direct data path may be defined with one or more granularities among a media or content type, an Access Point Name (APN), a QoS Class Identifier (QCI), a bearer or connection type, an application type, a service type, a destination domain, a UE for which ProSe permissibility is indicated, an opposite UE for communication, and a Closed Subscriber Group (CSG).

Embodiment 5

Embodiment 5 relates to an operation for performing direct communication with the opposite UE by the UE based on the response received from the network.

The UE (e.g., UE-1) which has received a response message to the ProSe control/permission request from the network node (e.g., MME) in Embodiment 4 may perform direct communication with the opposite UE (e.g., UE-2) for ProSe. That is, a direct communication path may be set up between UE-1 and UE-2 and thus communication may be performed therebetween.

If UE-1 which has requested direct communication with the opposite UE (e.g., UE-2) should perform direct data path setup to UE-2, UE-1 may set up a direct data path to UE-2 based on the various types of information included in the response message received in Embodiment 4 (e.g., QoS and PCC information, etc.) and/or various types of information pre-configured in UE-1 (e.g., QoS and PCC information, etc.).

If the ProSe control/permission request transmitted from UE-1 to the network in Embodiment 2 explicitly or implicitly includes a request to the network to set up a direct data path to the opposite UE (e.g., UE-2), or if the network is configured (e.g., based on operator policies, etc.) to set up a direct data path between the UE which has transmitted the ProSe control/permission request of Embodiment 2 (e.g., UE-1) and the opposite UE (e.g., UE-2) when the network receives the ProSe control/permission request, the network may set up a direct data path.

Embodiment 6

Embodiment 6 relates to an operation for reporting ProSe performance result information to the network by the UE.

The UE (e.g., UE-1 or UE-2) which has performed ProSe may report ProSe performance result information to the network node (e.g., MME) based on the information included in the response message to the ProSe control/permission request, which is received in Embodiment 4, and/or information configured in the UE. The network node (e.g., MME) which has received this report may store and/or utilize the received information, or transmit the UE-reported information to another network node (e.g., HSS, a node related to charging, or a third node (e.g., ProSe server)) to allow the other network node to store and/or utilize the information.

The ProSe performance result information may include one or more pieces of information described below.

Identification information of ProSe which has performed (e.g., reference number of ProSe).

Identification information of direct communication (e.g., reference number of direct communication).

Identification information of a direct data path (e.g., reference number of a direct data path).

Information indicating success or failure of direct data path setup.

Information about the amount of data and/or time for communication through the direct data path.

Charging information (e.g., time for which the direct data path is maintained, etc.).

Information about the types of media (or contents) communicated through the direct data path.

Information about the number of opposite UEs with which direct communication is performed through the direct data path.

Information about directionality of the direct data path (e.g., unidirectional communication from UE-1 to UE-2, unidirectional communication from UE-2 to UE-1, bidirectional communication between UE-1 and UE-2, or broadcasting from UE-1 to other UEs).

Information about an access type (e.g., E-UTRAN, WLAN, etc.) used for the direct data path.

Information about the number and types of bearers used for the direct data path.

The above-described ProSe performance result information may be reported to the network node (e.g., MME) immediately after direct communication is completed, or an accumulated result of all cases for direct communication performed between the UEs until performance of direct communication therebetween is no more possible may be transmitted to the network node (e.g., MME).

One of a plurality of UEs which have performed ProSe may report the ProSe performance result information to the network. Here, the UE may be a UE which has served as a master in ProSe, a UE which has served as an initiator of direct communication, a UE which has received the response message to the ProSe control/permission request from the network in Embodiment 4, or a UE which has transmitted data to an opposite UE in direct communication. Alternatively, two or more of a plurality of UEs which have performed ProSe may individually report the ProSe performance result information to the network.

If direct data path setup is performed (or initiated) by the network, one or more of UEs which have terminated direct communication may transmit a direct data path release request to the network. Here, the ProSe performance result information may be replaced by the direct data path release request or transmitted to the network using the release request.

The ProSe related information proposed above in Embodiment 1 to 6 may be exchanged between the network node and the UE using a conventional signaling message (e.g., attach request/accept/complete, TAU request/accept/complete, service request, extended service request, PDN connection request, Radio Resource Control (RRC) message, etc.) or in a manner to be included in the conventional signaling message. For example, the ProSe related information may be defined as a new field/parameter in the conventional signaling message, or by reusing or extending a conventional field/parameter. Alternatively, the ProSe related information may be transmitted and received using a message newly defined for the present invention other than the conventionally defined signaling message.

Various embodiments of the present invention are applicable to all UMTS/EPS mobile communication systems including 3GPP LTE/EPC networks, other 3GPP access networks (e.g., UTRAN/GERAN/E-UTRAN), and non-3GPP access networks (e.g., WLAN, etc.), and also applicable to all other radio mobile communication system environments to which network control is applied.

Figure 5:
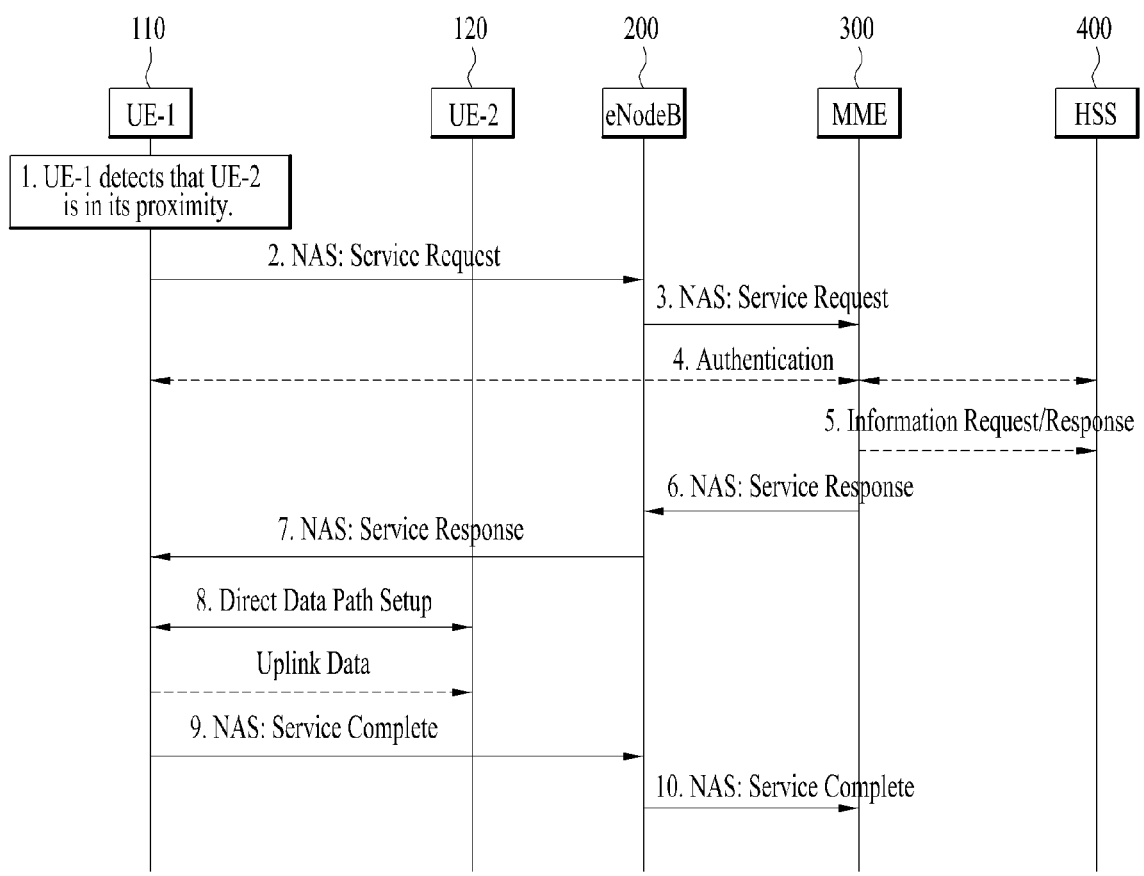
FIG. 5 is a view for describing a UE-initiated control method for providing ProSe, according to an embodiment of the present invention.

FIG. 5 is a view for describing a UE-initiated control method for providing ProSe, according to an embodiment of the present invention. FIG. 5 illustrates an exemplary case in which ProSe related information is signaled using a service request procedure.

In step 1 of FIG. 5, UE-1 110 may detect that UE-2 120 is in its proximity or may discover the UE-2 120. Reference can be made to Embodiment 1 for details of the ProSe UE detection/discovery operation of the UE-1 110.

In steps 2 and 3 of FIG. 5, to perform direct communication with the UE-2 120, the UE-1 110 may include information about a ProSe control/permission request to a service request message and transmit the service request message via an eNodeB 200 to an MME 300.

FIG. 5 assumes that the ProSe control/permission request includes the requests A and B (e.g., the control/permission request to use ProSe and the control/permission request to perform direct communication) described above in Embodiment 2. Further, the service request message may include the various types of information including the information about the opposite UE (e.g., UE-2 120) described above in Embodiment 2.

The service request message may include a request for a conventional type of communication (e.g., infrastructure communication) with the UE-2 120. For example, both direct communication and conventional infrastructure communication are desired between the UE-1 110 and the UE-2 120, both of requests for these two types of communication may be included in the service request message.

Further, in steps 2 and 3, various types of information included in the ProSe control/permission request may be transmitted from the UE-1 110 to the MME 300 by adding a new field/parameter to or reusing a conventional field/parameter of the service request message, or using a newly defined message other than the service request message. Reference can be made to Embodiment 2 for details of the operation for transmitting the ProSe control/permission request of the UE-1 110.

In step 4 of FIG. 5, the MME 300 may perform authentication on the UE-1 110, and the authentication operation may include interaction with an HSS 400.

In step 5 of FIG. 5, the MME 300 may determine whether to accept the ProSe control/permission request received from the UE-1 110 in step 3. For details thereof, reference can be made to Embodiment 3.

In this case, the MME 300 may interact with another entity to acquire information required for the determination. Here, the entity with which the MME 300 interacts to acquire information required for the determination may include one or more of examples described below.

The UE-1 110 and/or the UE-2 120.

The eNodeB 200 on which the UE-1 110 is camped and/or an eNodeB on which the UE-2 120 is camped. For example, the eNodeB on which the UE-2 120 is camped may be the same as or different from the eNodeB 200 on which the UE-1 110 is camped.

An MME for serving the UE-2 120. If the MME for serving the UE-2 120 is different from the MME 300 for serving the UE-1 110, the MME 300 may acquire information about the UE-2 120 (directly or indirectly via another node) by interacting with the MME for serving the UE-2 120. In addition, if the MME for serving the UE-2 120 is different from the MME 300 for serving the UE-1 110, the MME for serving the UE-2 120 may be changed to the MME 300 for serving the UE-1 110.

An HSS having subscriber information of a subscriber to which the UE-1 110 belongs and/or an HSS having subscriber information of a subscriber to which the UE-2 120 belongs. The two HSSes may be the same or different HSSes.

A third node (e.g., ProSe server) having ProSe related information of the UE-1 110 and/or a third node (e.g., ProSe server) having ProSe related information of the UE-2 120. For example, the two third nodes may be the same or different nodes.

Although the MME 300 transmits an information request to and receives a response from the HSS 400 in step 5 of FIG. 5, step 5 is not limited thereto. For example, if the MME 300 has already acquired all pieces of necessary information from the HSS 400 in a previous step, the operation of step 5 may be replaced with interaction between the MME 300 and another network node.

Alternatively, if the MME 300 already has all pieces of information required for the determination, the MME 300 may not interact with any of the HSS 400 and another node.

In steps 6 and 7 of FIG. 5, the MME 300 which has made the determination may transmit a response to the ProSe control/permission request to the UE-1 110. For details thereof, reference can be made to Embodiment 4.

If the service request message received by the MME 300 in step 3 also includes a request to perform a conventional type of communication (e.g., infrastructure communication), the MME 300 may perform operations for infrastructure communication based on a conventional UE triggered service request procedure. These operations may be performed in parallel with operations for direct communication, and a part of messages exchanged between the MME 300 and the UE-1 110 during these operations (e.g., service response message of steps 6 and 7 of FIG. 5) may include both infrastructure communication related information and direct communication related information.

In step 8 of FIG. 5, the UE-1 110 may set up a direct data path for direct communication with the UE-2 120 which is the opposite UE. FIG. 5 assumes that the UE-1 110 transmits video-type media to the UE-2 120. In this case, the UE-1 110 may transmit the video media to the UE-2 120 through the set direct data path.

After the UE-1 110 which is a data transmitter has completely transmitted the video media to the UE-2 120, the UE-1 110 may report ProSe performance result information to the MME 300.

In steps 9 and 10 of FIG. 5, the UE-1 110 may transmit the ProSe performance result information to the MME 300 using a service complete message. The service complete message may be transmitted for a conventionally defined purpose as well as the purpose of transmitting the ProSe performance result information. Accordingly, the ProSe performance result information may be transmitted using a newly defined message or in a manner to be included in a conventionally defined message.

If the service request message received by the MME 300 in step 3 does not include a request to perform a conventional type of communication (e.g., infrastructure communication), i.e., if the service request message includes only a request to perform direct communication, the MME 300 may transmit information indicating to release RRC connection of the UE-1 110 or information indicating not to establish RRC connection of the UE-1 110, to the eNodeB 200. This information may be included in a conventional message transmitted from the MME to the eNodeB, or a newly defined message. Further, this message may be transmitted during the procedure illustrated in FIG. 5 (e.g., step 6) or a procedure not illustrated in FIG. 5. Instead of receiving the information indicating to release RRC connection of the UE-1 110 or the information indicating not to establish RRC connection of the UE-1 110 from the MME 300, the eNodeB 200 may determine whether to release or not to establish RRC connection of the UE-1 110, based on a message transmitted from the UE-1 110 or information included in the message. This information may be included in a conventional message transmitted from the UE to the eNodeB, or a newly defined message. Further, this message may be transmitted during the procedure illustrated in FIG. 5 (e.g., step 2) or a procedure not illustrated in FIG. 5. The information indicating to release RRC connection of the UE-1 110 or the information indicating not to establish RRC connection of the UE-1 110 may be explicit or implicit.

According to the UE-initiated control mechanism for supporting ProSe proposed by the present invention, network loads may be reduced due to an efficient control mechanism of a control plane and various proximity-based services may be provided to users due to efficient communication between ProSe UEs.

The above-described embodiments of the present invention may be applied independently or two or more embodiments may be applied simultaneously.

Figure 6:
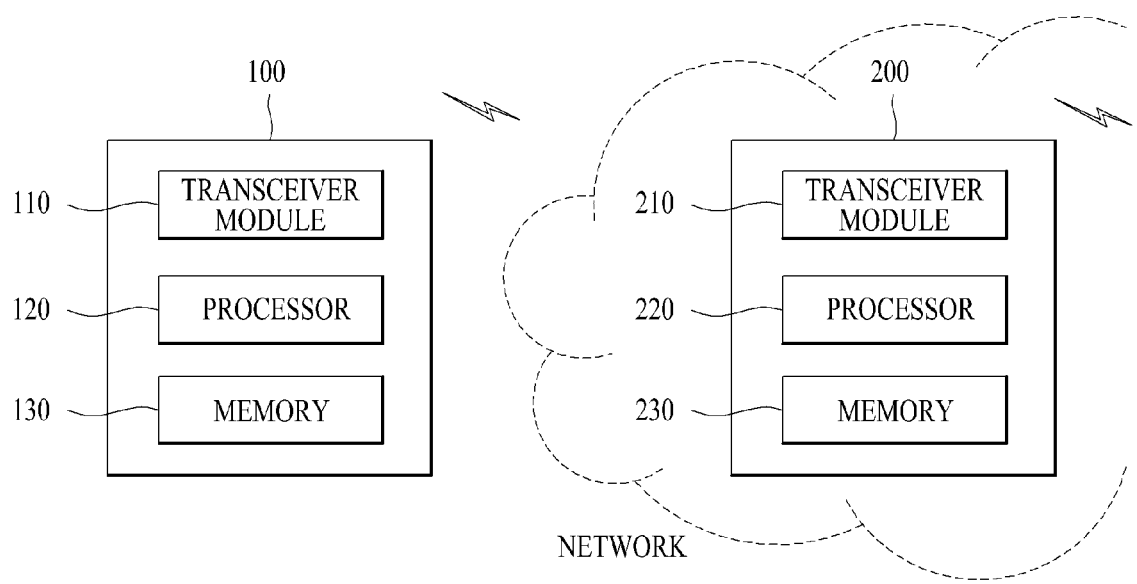
FIG. 6 is a view illustrating the configurations of a UE and a network node according to an embodiment of the present invention.

FIG. 6 is a view illustrating the configurations of a UE 100 and a network node 200 according to an embodiment of the present invention.

Referring to FIG. 6, the UE 100 may include a transceiver module 110, a processor 120 and a memory 130. The transceiver module 110 may be configured to transmit and receive various types of signal, data and information to and from an external device. The UE 100 may be connected to the external device by wire and/or wirelessly. The processor 120 may be configured to provide overall control to the UE 100 and process information, etc. to be transmitted to or received from the external device by the UE 100. The memory 130 may store the processed information, etc. for a predetermined time and replaced by an element such as a buffer (not shown).

The UE 100 may be configured to perform ProSe. The processor 120 may be configured to detect another UE with which the UE 100 is capable of performing ProSe. Further, the processor 120 may be configured to transmit a message including a ProSe permission/control request to the network node 200 using the transceiver module 110. Besides, the processor 120 may be configured to receive a response to the ProSe permission request from the network node 200 using the transceiver module 110. In addition, the processor 120 may be configured to set up a direct data path to the other UE. Further, the processor 120 may be configured to transmit ProSe performance result information with the other UE to the network node 200 using the transceiver module 110.

Referring to FIG. 6, the network node 200 may include a transceiver module 210, a processor 220 and a memory 230. The transceiver module 210 may be configured to transmit and receive various types of signal, data and information to and from an external device. The network node 200 may be connected to the external device by wire and/or wirelessly. The processor 220 may be configured to provide overall control to the network node 200 and process information, etc. to be transmitted to or received from the external device by the network node 200. The memory 230 may store the processed information, etc. for a predetermined time and replaced by an element such as a buffer (not shown).

The network node 200 may be configured to support ProSe among a plurality of UEs according to ProSe opposite UE detection/discovery initiated by a certain UE (e.g., the UE 100). The processor 220 may be configured to transmit information related to detection of another UE with which the UE 100 is capable of performing ProSe, to the UE 100 using the transceiver module 210. Further, the processor 220 may be configured to receive a message including a ProSe permission/control request from the UE 100 using the transceiver module 210. Besides, the processor 220 may be configured to determine whether to accept the ProSe permission/control request. In addition, the processor 220 may be configured to transmit a response to the ProSe permission request to the UE 100 using the transceiver module 210. Further, the processor 220 may be configured to receive ProSe performance result information between the UEs from the UE 100 using the transceiver module 210.

In addition, for the detailed configurations of the UE 100 and the network node 200, the above-described embodiments of the present invention may be applied independently or two or more embodiments may be applied simultaneously, and repeated descriptions are omitted for clarity.

The above-described embodiments of the present invention may be implemented by various means, for example, hardware, firmware, software, or a combination thereof.

In a hardware configuration, the methods according to embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. performing the above-described functions or operations. A software code may be stored in a memory unit and executed by a processor. The memory unit may be located inside or outside the processor and exchange data with the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

The invention claimed is:

1. A method for performing a proximity service (ProSe) by a first user equipment (UE) of a wireless communication system, the method comprising:

detecting a second UE with which the first UE is capable of performing ProSe;

transmitting a ProSe permission request message to a network node, wherein the ProSe permission request message comprises information about a specific type of content or service for the ProSe, and a specific directionality of the ProSe;

receiving a response to the ProSe permission request from the network node, the response indicating whether the ProSe permission request is accepted or not, wherein the response to the ProSe permission request comprises all of policy control rule related information, charging control rule related information, and information indicating operation after ProSe is completely performed; and setting up a direct data path for performing the ProSe with the second UE if the ProSe permission request is accepted, wherein the direct data path is set up for only the specific type of content or service for the ProSe, and the specific directionality of the ProSe.

2. The method according to claim 1, wherein the second UE is detected using one or more of:

a scheme for detecting the second UE based on information about the second UE provided from the network node; or a scheme for receiving information about the second UE detected by the network node.

3. The method according to claim 1, wherein the detected second UE is camped on the same base station or cell as the first UE.

4. The method according to claim 1, wherein the specific type of content for the ProSe indicates a part of voice, video, image and text.

5. The method according to claim 1, wherein the specific type of service for the ProSe indicates a part of instant messaging service, a file sharing service, a public safety service, a chatting service and a social networking service.

6. The method according to claim 1, wherein the ProSe permission request message is transmitted at a point of time when direct communication with the second UE is required after the first UE detects the second UE.

7. The method according to claim 1, wherein the specific directionality of the ProSe indicates one of unidirectional communication from the first UE to the second UE, unidirectional communication from the second UE to the first UE, bidirectional communication between the first UE and the second UE, and broadcasting from the first UE to other UEs.

8. The method according to claim 7, wherein whether the ProSe permission request is accepted or not is determined based on all of operator policy information, network ProSe capability related information, and network congestion related information related to one or more of the first and second UEs.

9. The method according to claim 1, further comprising:

transmitting ProSe performance result information to the network node, wherein the ProSe performance result information comprises information about a type of content or service communicated through the direct data path, information about the number of opposite UEs comprising the second UE, and information about directionality of the direct data path.

10. The method according to claim 1, wherein the network node comprises one of a Mobility Management Entity (MME), a Serving GPRS (General Packet Radio Service) Supporting Node (SGSN), an evolved Node B (eNodeB) and a ProSe server.

11. A user equipment (UE) for performing a proximity service (ProSe) in a wireless communication system, the UE comprising:

a transceiver for transmitting and receiving signals to and from an external device; and a processor for controlling the transceiver, wherein the processor is configured to detect another UE with which the UE is capable of performing ProSe, transmit a ProSe permission request message to a network node using the transceiver, receive a response to the ProSe permission request from the network node using the transceiver, the response indicating whether the ProSe permission request is accepted or not, wherein the response to the ProSe permission request comprises all of policy control rule related information, charging control rule related information, and information indicating operation after ProSe is completely performed, and set up a direct data path for performing the ProSe with the other UE, wherein the ProSe permission request message comprises information about a specific type of content or service for the ProSe, and a specific directionality of the ProSe, and wherein the direct data path is set up for only the specific type of content or service for the ProSe, and the specific directionality of the ProSe.

* * * * *